United States Patent
Lee et al.

(10) Patent No.: US 9,422,464 B2
(45) Date of Patent: Aug. 23, 2016

(54) ADHESIVES COMPRISING REACTION PRODUCT OF HALOGENATED POLY(ISOBUTYLENE) COPOLYMERS AND POLYAMINES

(71) Applicant: 3M INNOVATIVE PROPERTIES COMPANY, St. Paul, MN (US)

(72) Inventors: Hae-Seung Lee, Woodbury, MN (US); Pierre R. Bieber, Duesseldorf (DE); Joon Chatterjee, Bloomington, MN (US); Siegfried R. Goeb, Willich (DE); Babu N. Gaddam, Woodbury, MN (US)

( * ) Notice: Subject to any disclaimer, the term of this patent is extended or adjusted under 35 U.S.C. 154(b) by 12 days.

(21) Appl. No.: 14/394,342

(22) PCT Filed: Feb. 6, 2013

(86) PCT No.: PCT/US2013/024822
§ 371 (c)(1),
(2) Date: Oct. 14, 2014

(87) PCT Pub. No.: WO2013/169317
PCT Pub. Date: Nov. 14, 2013

(65) Prior Publication Data
US 2015/0072143 A1 Mar. 12, 2015

Related U.S. Application Data

(60) Provisional application No. 61/645,733, filed on May 11, 2012.

(51) Int. Cl.
| | | |
|---|---|---|
| C09J 7/02 | (2006.01) | |
| C09J 123/20 | (2006.01) | |
| C09J 123/36 | (2006.01) | |
| C09J 123/22 | (2006.01) | |
| C08L 23/22 | (2006.01) | |

(52) U.S. Cl.
CPC .............. *C09J 123/36* (2013.01); *C08L 23/22* (2013.01); *C09J 7/02* (2013.01); *C09J 123/20* (2013.01); *C09J 123/22* (2013.01); *C09J 2423/00* (2013.01); *Y10T 428/2852* (2015.01)

(58) Field of Classification Search
CPC ......... C09J 7/02; C09J 123/20; C09J 123/36
See application file for complete search history.

(56) References Cited

U.S. PATENT DOCUMENTS

| | | | | |
|---|---|---|---|---|
| 2,958,675 A | * | 11/1960 | Laffey | C08K 5/39 524/201 |
| 5,459,174 A | | 10/1995 | Merrill | |
| 5,602,221 A | | 2/1997 | Bennett | |
| 6,063,838 A | | 5/2000 | Patnode | |
| 6,630,238 B2 | | 10/2003 | Hyde | |
| 6,632,522 B1 | | 10/2003 | Hyde | |
| 8,629,209 B2 | * | 1/2014 | Lee | C08F 8/42 428/355 EN |
| 8,673,995 B2 | | 3/2014 | Chatterjee | |
| 8,673,996 B2 | * | 3/2014 | Lee | C08L 23/22 522/149 |
| 2005/0208249 A1 | | 9/2005 | Wen | |
| 2012/0082847 A1 | * | 4/2012 | Lee | C08F 8/00 428/345 |
| 2012/0208013 A1 | * | 8/2012 | Clapper | C08G 81/021 428/355 AC |
| 2012/0322910 A1 | | 12/2012 | Chatterjee | |

FOREIGN PATENT DOCUMENTS

| | | |
|---|---|---|
| WO | WO 2006-093702 | 9/2006 |
| WO | WO 2007-087281 | 8/2007 |
| WO | WO 2009-148716 | 12/2009 |
| WO | WO 2009-148722 | 12/2009 |
| WO | WO 2010-083192 | 7/2010 |
| WO | WO 2010-141248 | 12/2010 |
| WO | WO 2011-017298 | 2/2011 |
| WO | WO 2011-062851 | 5/2011 |
| WO | WO 2011-062852 | 5/2011 |
| WO | WO 2012-044417 | 4/2012 |
| WO | WO 2012-067741 | 5/2012 |
| WO | WO 2012-067902 | 5/2012 |
| WO | WO 2012-074733 | 6/2012 |
| WO | WO 2012-078292 | 6/2012 |
| WO | WO 2012-112303 | 8/2012 |
| WO | WO 2012-112321 | 8/2012 |
| WO | WO 2013-147989 | 10/2013 |
| WO | WO 2013-184368 | 12/2013 |

OTHER PUBLICATIONS

Hexamethylenediamine, Wikipedia, [retrieved from the internet on Apr. 3 2012], <http://en.wikipedia.org/wiki/Hexamethylenediamine>, pp. 1.
International Search Report for PCT International Application No. PCT/US2013/024822; mailed on Apr. 10, 2013, 4 pgs.

* cited by examiner

*Primary Examiner* — Robert Harlan

(57) ABSTRACT

Adhesive composition are described comprising the reaction product of at least one halogenated copolymer of isobutylene wherein halogen atoms of the copolymer are replaced by a polyamine having a melting point greater than 25° C., thereby crosslinking the copolymer. The isobutylene copolymer comprises halogenated repeat units derived from isoprene, butadiene, para-alkyl styrene, or a combination thereof. The adhesive composition comprises a copolymer of isobutylene repeat units and second repeat units selected from alkene repeat units, para-methyl styrene repeat units, or a combination thereof wherein at least a portion of the second repeat units are directly bonded to one another with a polyamine crosslinker having a melting point greater than 25° C. Also described are adhesive articles, such as tapes, comprising such adhesives.

20 Claims, No Drawings

ADHESIVES COMPRISING REACTION PRODUCT OF HALOGENATED POLY(ISOBUTYLENE) COPOLYMERS AND POLYAMINES

CROSS REFERENCE TO RELATED APPLICATIONS

This application is a national stage filing under 35 U.S.C. 371 of PCT/US2013/024822, filed Feb. 6, 2013, which claims priority to U.S. Application No. 61/645,733, filed May 11, 2012, the disclosure of which is incorporated by reference in their entirety herein.

BACKGROUND

Polyisobutylene (PIB) has been considered an attractive material for low surface energy (LSE) bonding applications due to its excellent adhering properties on olefin-based thermoplastics. (See for example WO 2011/062852 and WO 2011/062851)

SUMMARY

In one embodiment, an adhesive composition is described comprising the reaction product of at least one halogenated copolymer of isobutylene wherein halogen atoms of the copolymer are replaced by a polyamine having a melting point greater than 25° C., thereby crosslinking the copolymer. The isobutylene copolymer comprises halogenated repeat units derived from isoprene, butadiene, para-alkyl styrene, or a combination thereof.

In another embodiment, the adhesive composition comprises a copolymer of isobutylene repeat units and second repeat units selected from alkene repeat units, para-methyl styrene repeat units, or a combination thereof wherein at least a portion of the second repeat units are directly bonded to one another with a polyamine crosslinker having a melting point greater than 25° C.

Also described are adhesive articles, such as tapes, comprising the described adhesive compositions.

DETAILED DESCRIPTION

The invention described herein relates to adhesives prepared from isobutylene copolymers, and tape articles prepared therefrom. In favored embodiments, the adhesive are pressure-sensitive adhesives.

The adhesive composition comprises the reaction product of at least one halogenated copolymer of isobutylene wherein halogen atoms of the copolymer are replaced by a polyamine having a melting point greater than 25° C., thereby crosslinking the copolymer. In some embodiments, the crosslinked copolymer itself can be utilized as an adhesive. In other embodiments, the adhesive comprises such crosslinked isobutylene copolymer is combination with a tackifier, unfunctionalized isobutylene polymer (i.e. copolymer or homopolymer), or a combination thereof.

The copolymer of isobutylene comprises isobutylene repeat units and halogenated second repeat units. In some embodiments, the halogenated second repeat units are alkene repeat units. As used herein, "alkene" means a linear or branched divalent hydrocarbon having an unsaturation, e.g. isoprene, butene, pentene, hexene, octene and the like. In typical embodiments, the alkene repeat units of the copolymer typically comprise isoprene, butene, or a combination thereof.

Halogenated units derived from isoprene can be represented by the following formulas:

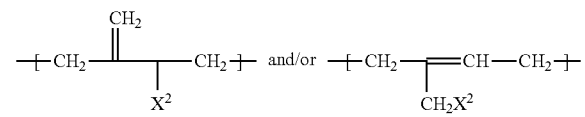

wherein $X^2$ is bromine.

In other embodiments, the halogenated second repeat units are para-alkyl styrene repeat units.

Halogenated units derived from para-alkyl styrene can be represented by the following formula:

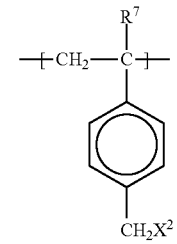

wherein $X^2$ is bromine and $R^7$ is H or $CH_3$

Although a halogenated copolymer of isobutylene is utilized as a starting material, the halogen atoms are replaced upon reaction with the polyamine. Hence, the adhesive comprises a crosslinked copolymer of isobutylene repeat units and second repeat units wherein at least a portion of the second repeat units are directly bonded to each other by means of a polyamine crosslinker.

In some embodiments, isobutylene and alkene repeat units, such as derived from isoprene or butadiene, are the only repeat units of the copolymer of the adhesive. In other embodiments, isobutylene and para-alkylstyrene repeat units are the only repeat units of the copolymer of the adhesive. In yet other embodiments, the adhesive comprises a combination of at least two isobutylene copolymers, the first having alkene repeat units and the second having para-alkylstyrene repeat units. Alternatively a single isobutylene copolymer may be employed having isobutylene repeat units, alkene repeat units, and para-alkyl styrene repeat units; as represented by the following formula:

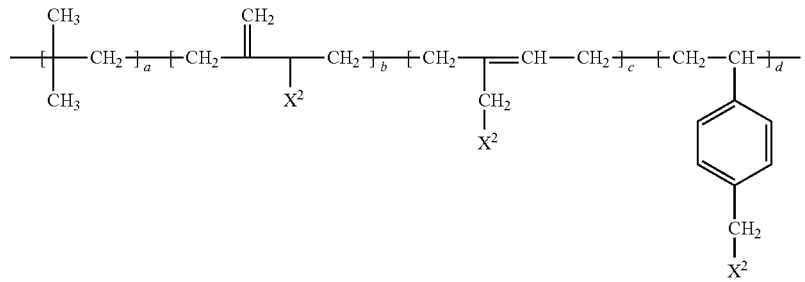

The copolymer of isobutylene generally comprises a minor concentration of second (e.g. alkene, para-alkyl styrene) repeat units that are halogenated prior to reaction with the polyamine. The halogen (e.g. bromine) concentration of the isobutylene copolymer is greater than 0% by weight and typically at least 0.5, 1, 1.5 or 2 wt.-% of the copolymer. The halogen is typically no greater than 20% by weight and in some embodiments no greater than 15, 14, 13, 12, or 10 wt.-%. The number of pendent halogen atoms (e.g. bromine) is half the maximum number of crosslinked units (i.e. the maximum being the replacement of all the halogen atoms). A low concentration of halogenated second repeat units is amenable to increasing shear strength via crosslinking, while maintain adequate peel adhesion properties.

The copolymer of isobutylene and halogenated second repeat units is crosslinked with a polyamine. The polyamine crosslinker may be straight-chain, branched, and in some favored embodiments cyclic. In some embodiments, the polyamine crosslinker is aliphatic. In other embodiments, the polyamine crosslinker is aromatic.

Useful polyamine are of the general formula $R_5$—$(NR_1R_2)x$ wherein $R_1$ and $R_2$ are independently H or alkyl, $R_5$ is a polyvalent alkylene or arylene, and x is at least two. The alkyl groups of $R_1$ and $R_2$ are typically $C_1$ to $C_{18}$ alkyl and most typically methyl. $R_1$ and $R_2$ may be taken together to form a cyclic amine. In some embodiment x is two (i.e. diamine). In other embodiments, x is 3 (i.e. triamine). In yet other embodiments, x is 4.

Useful polyamines include diamines having at least two amino groups, wherein the two amino groups are primary, secondary, tertiary or a combination thereof. Diamines may be represented by the general formula:

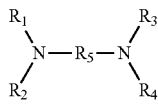

wherein $R_1$, $R_2$, $R_3$ and $R_4$ are independently H or alkyl, and R5 is a divalent alkylene or arylene. In some embodiments, $R_1$, $R_2$, $R_3$ and $R_4$ are each H and the diamine is a primary amine. In other embodiments, $R_1$ and $R_4$ are each H and $R_2$, and $R_4$ are each independently alkyl; and the diamine is a secondary amine. In yet other embodiments, $R_1$, $R_2$, $R_3$ and $R_4$ are independently alkyl and the diamine is a tertiary amine.

Examples include hexamethylene diamine; 1,10-diaminodecane; 1,12-diaminododecane; 2-(4-aminophenyl)ethylamine; 4,4'-diaminodicyclohexylmethane; and 1,3-bis(aminomethyl)cyclohexane. Illustrative six member ring diamines include for example piperzine and 1,4-diazabicyclo[2.2.2]octane ("DABCO").

Other useful polyamines include polyamines having at least three amino groups, wherein the three amino groups are primary, secondary, or a combination thereof. Examples include 3,3'-diaminobenzidine and hexamethylene triamine.

Polymeric polyamines can also be utilized; including for example poly(4-vinylpyridine) and branched polyethylenimine.

As shown in the following table, polyamine crosslinkers have various physical properties and reactivity. The halogenated copolymer of isobutylene is crosslinked with a polyamine crosslinker that is a solid at room temperature (e.g. 25° C.). Polyamines that are solids at room temperature have low odor due to having low vapor pressures. As indicated in the following table, polyamines having such property are straight-chain or branched polyamines having an alkylene group comprising at least 6 carbons. Cyclic polyamines are also favorably solids at room temperature. In some embodiments, the polyamine has a melting point of at least 100° C., 125° C., or 150° C. The melting point is typically no greater than 300° C., and in some embodiments no greater than 250° C., or 225° C. or 200° C., or 175° C.

The molecular weight of useful polyamines that are solids at room temperature (e.g. 25° C.) is typically at least 100, 105, 110, or 115 g/mole. For embodiments wherein polymeric polyamines are employed, the (weight average) molecular weight of the polyamine can range up 100,000 g/mole; yet is typically less than the molecular weight of the isobutylene copolymer. In some embodiments, the (weight average) molecular weight of the polyamine is no greater than 75.000 g/mole, 50,000 g/mole or 25,000 g/mole. When non-polymeric polyamines are employed the molecular weight of the polyamine is typically no greater than 1500 g/mole and in some embodiments no greater than 1000 or 500 g/mole.

| Polyamine | Amine Property | Volatility |
|---|---|---|
| $H_2N\!\!-\!\!\diagup\!\!\diagdown\!\!-\!\!NH_2$<br>Ethylenediamine (ED) | Primary 1° | Liquid at R.T.<br>B.P.: 108° C. |
| $CH_3NHCH_2CH_2NHCH_3$<br>N,N'-Dimethylethylenediamine (DMED) | Secondary 2° | Liquid at 25° C.<br>B.P.: 119° C. |
| 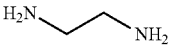<br>N,N,N',N'-tetramethylethylenediamine (TMED) | Tertiary 3° | Liquid at 25° C.<br>B.P.: 120-122° C. |
| Hexamethylenediamine | Primary 1° | Solid at 25° C.<br>M.P.: 41° C.<br>B.P. 205° C. |
| 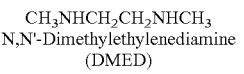<br>Piperazine (PZ) | 2° (cyclic) | Solid at 25° C.<br>M.P.: 109-112° C.<br>B.P.: 145° C. |
| 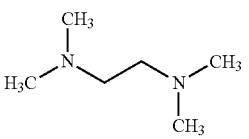<br>1,4-Diazabicyclo[2.2.2]octane (DABCO) | 3° (cyclic) | Solid at 25° C.<br>M.P.: 156-160° C.<br>B.P.: 174° C. |

As indicated in the table above, polyamines have various degrees of nucleophilicity (i.e. reactivity). In generally, aliphatic polyamines generally have stronger nucleophilicity (e.g. localized electron density on the nitrogen atoms) than aromatic polyamines. Further, unsubstituted or less substituted polyamines have less steric hindrance than increasingly substituted polyamines which can result in higher reactivity. On the other hand, the electron-donating effect of tertiary amines is generally greater than secondary amines, which is in turn greater than primary amines. In some embodiments, secondary amines are favored over primary amines. Further, tertiary amine can be favored over secondary amines.

The adhesive compositions are applied as a solvent solution or dispersion, the solvent evaporated, and the adhesive composition crosslinked during solvent evaporation. Suitable solvents such as alkanes, toluene and tetrahydrofuran are unreactive with the bromine group and polyamine groups of the components of the copolymer. Without intending to be bound by theory, it is surmised that stronger nucleophilicity favors crosslinking at lower temperatures and shorter drying times.

Although catalysts or an alkylating agent could be employed, such crosslinking reaction can simply be initiated by increased temperature. For example, straight chain and branched polyamines are typically heated to about 150° C. However, when cyclic polyamines are utilized, the crosslinking readily occurs at temperatures below 100° C. In some embodiments, drying temperatures of no greater 90° C., 80° C. or 70° C. were suitable. Additionally uncrosslinked compositions comprising various polyamines were found to have a relatively long pot life, of for example 40 to 300 hours at room temperature (25° C.). Such long pot life is beneficial for (e.g. tape) manufacturing processes.

In some embodiments, the copolymers are generally prepared by nucleophilic substitution of commercially available halogenated PIB's, with primary or secondary polyamines. In other embodiments, the copolymers are generally prepared by nucleophilic displacement of commercially available halogenated PIBs, with a tertiary polyamine thereby displacing halogen (e.g. bromine) atoms as negatively charged counter ions. In either of these reaction schemes the halogen atoms are "replaced" by the amino groups.

When the halogenated copolymer comprises halogenated repeat units derived from isoprene, the reaction scheme with a diamine, as a representative polyamine, can be depicted as follows:

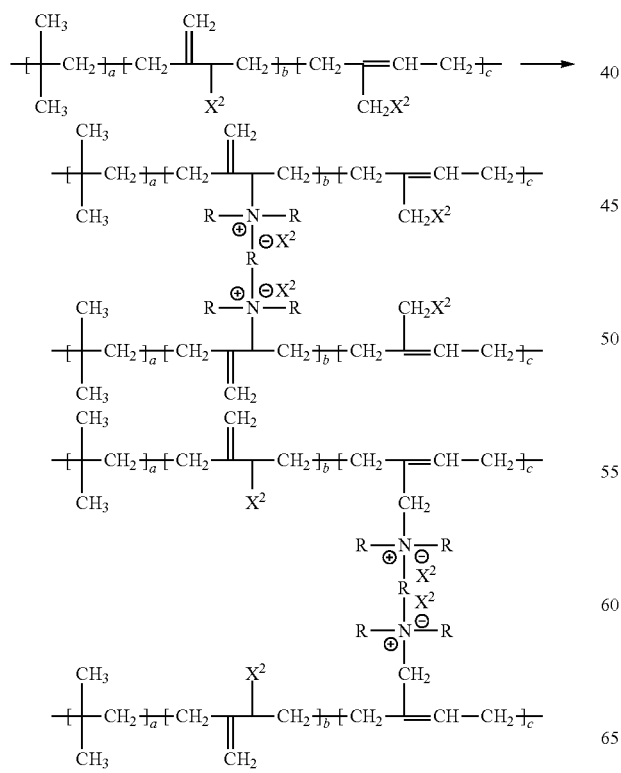

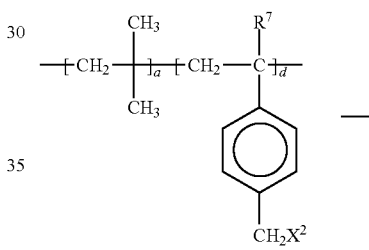

wherein $X^2$ is a halogen, preferably bromine and R generically represent that various R groups ($R_1$-$R_5$) of the polyamine, as previously described.

When the halogenated copolymer comprises halogenated repeat units derived from para-methyl styrene, the reaction scheme with a diamine, as a representative polyamine, can be depicted as follows:

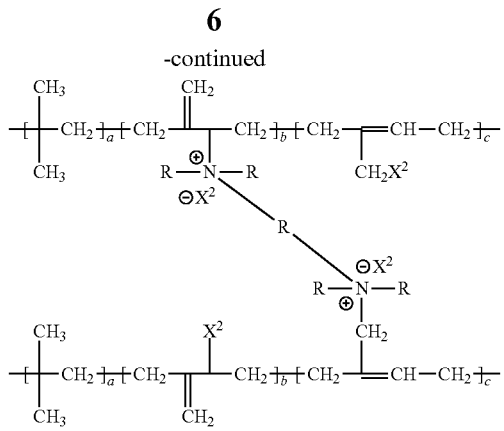

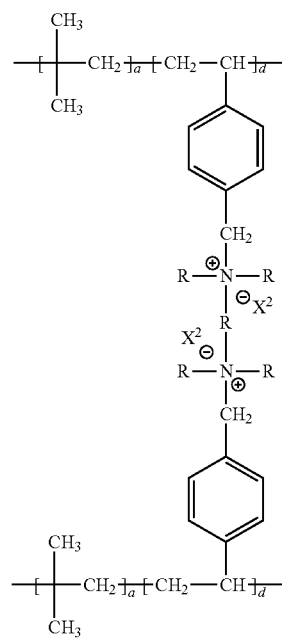

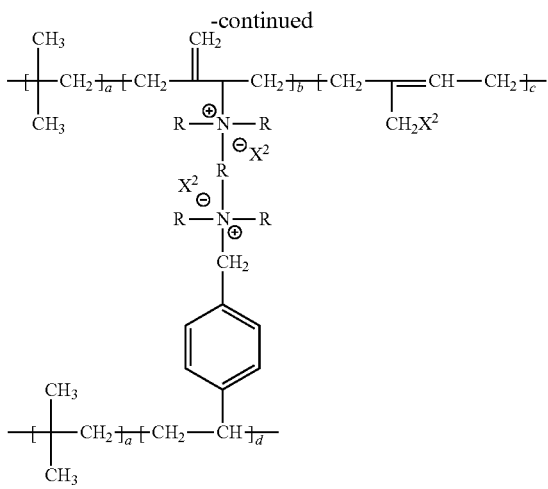

wherein $X^2$ is a halogen, preferably bromine and R generically represent that various R groups ($R_1$-$R_5$) of the polyamine, as previously described.

It will be recognized that the monomer units having the subscript "a" are polymerized isobutylene monomer units. Further, the subscripts "b" and "c" and "d" are chosen such that the copolymer comprises 1 to 20 wt.-% of the respective monomer units, as previously described. The reaction product typically comprises a distribution of the various crosslinked second repeat units, such as depicted above.

As illustrated by the above reaction schemes the (formerly halogenated) second repeat units are directly bonded (i.e. crosslinked) with the polyamine (e.g. diamine). Thus, there are no other linking groups (e.g. such as the pendent anhydride group described in 67303US004) between the (formerly halogenated) second repeat units and polyamine. Further, it is appreciated that the number of amino groups of the polyamine is the maximum number of halogenated repeat units that can be crosslinked by the same polyamine. Thus, for example a triamine can crosslink three copolymer chains via the brominated second repeat units.

In some embodiments, the adhesive comprises a random copolymer of isobutylene and halogenated (e.g. brominated) alkene (e.g. isoprene) repeat units, such as a commercially available from Lanxess. "Lanxess Bromobutyl 2030" isobutylene copolymer has a bromine content of about 1.5 to 2.0 wt.-% and a molecular weight (Mw) of about 500,000 g/mole. "Lanxess Bromobutyl X2" isobutylene copolymer has a bromine content of about 1.80±0.20 wt.-% and a molecular weight Mw) of about 650,000 g/mole.

In some embodiments, the adhesive comprises a random copolymer of isobutylene and halogenated (e.g. brominated) para-methylstyrene repeat units, such as commercially available from Exxon Chemical Co. under the trade name of EXXPRO, including MDX90-10 MDX89-4. MDX90-10 isobutylene copolymer comprises 1.2 mole % or 7.5 wt-% of brominated para-methylstyrene; whereas MDX90-10 isobutylene copolymer comprises 0.75 mole % or 5 wt-% of brominated para-methylstyrene. Paramethylstyrene monomer units can impart heat resistance and strength to the copolymer by the cohesive force and hardness of paramethylstyrene itself. However, the adhesive compositions described herein exhibit good adhesion in combination with high shear values (10,000 minutes+at room temperature) in the absence of the copolymer comprising paramethylsytrene repeat units.

In other embodiments, an unfunctionalized (unhalogenated) isobutylene copolymer may be halogenated by reacting with N-bromosuccinimide (NBS) or atomic bromine and then subsequently reacted with a tertiary amine compound comprising a free-radically polymerizable substituent. Additionally, unfunctionalized homopolymers and copolymers can be blended with the halogenated polyisobutylene copolymer. Thus, unfunctionalized isobutylene copolymers are useful as a starting material. Unfunctionalized polyisobutylene copolymers and homopolymers are also useful as an optional, but additional component of the adhesive composition.

The polyisobutylene material is typically prepared by polymerizing isobutylene alone or by polymerizing isobutylene plus additional ethylenically unsaturated monomers, such as isoprene, butadiene, or a combination thereof in the presence of a Lewis Acid catalyst such as aluminum chloride, boron trichloride (with titanium tetrachloride as a co-catalyst), or boron trifluoride. Copolymers are typically random copolymers. However, block copolymers could alternatively be utilized.

In some embodiments, the weight average molecular weight ($M_w$) of the (halogenated or unfunctionalized) isobutylene copolymer is at least 25,000 grams per mole, at least 50,000 grams per mole, at least 100,000 grams per mole, or at least 150,000 grams per mole. In some embodiments, the weight average molecular weight is typically no greater than 4,000,000 g/mole or 3.000,000 g/mole, or 2,000,000 g/mole, or 1,000,000 g/mole, or 500,000 g/mole.

The unfunctionalized isobutylene copolymers are generally synthetic rubbers having a polyisobutylene main. In some embodiments, the isobutylene copolymers of isobutylene are synthetic rubbers wherein isobutylene is copolymerized with another monomer. Synthetic rubbers include butyl rubbers which are copolymers of mostly isobutylene with a small amount of alkylene, such as isoprene, for example, butyl rubbers available under the tradenames VISTANEX (Exxon Chemical Co.) and JSR BUTYL (Japan Butyl Co., Ltd.). Synthetic rubbers also include copolymers of mostly isobutylene with n-butene or butadiene. In some embodiments, a mixture of isobutylene homopolymer and butyl rubber may be used, i.e., a first polyisobutylene comprises a homopolymer of isobutylene and the second polyisobutylene comprises butyl rubber, or a first polyisobutylene comprises butyl rubber and a second polyisobutylene comprises a homopolymer of isobutylene.

In some embodiments, the adhesive further comprises an unfunctionalized isobutylene homopolymer in combination with the crosslinked halogenated isobutylene copolymer.

Homopolymers are commercially available, for example, under the trade designation OPPANOL (e.g., OPPANOL B10, B15, B30, B50, B80, B100, B150, and B200) from BASF Corp. (Florham Park, N.J.). These polymers often have a weight average molecular weight ($M_w$) in the range of about 35,000 to 4,000,000 grams per mole. Still other exemplary homopolymers are commercially available from United Chemical Products (UCP) of St. Petersburg, Russia in a wide range of molecular weights. For example, homopolymers commercially available from UCP under the trade designation SDG have a viscosity average molecular weight ($M_v$) in the range of about 35,000 to 65,000 grams per mole. Homopolymers commercially available from UCP under the trade designation EFROLEN have a viscosity average molecular weight ($M_v$) in the range of about 480,000 to about 4,000,000 grams per mole. Homopolymers commercially available from UCP under the trade designation JHY have a viscosity average molecular weight in the range of about 3000 to about 55,000 grams per mole. These homopolymers typically do not have reactive double bonds that form covalent bonds via free-radical polymerization.

When utilized, the concentration of unfunctionalized isobutylene copolymer or homopolymer in the pressure sensitive adhesive composition is typically at least 5 wt. %, or 10 wt.-%, 15 wt.-%. The concentration of unfunctionalized isobutylene copolymer or homopolymer is typically no greater than 60 wt. %, or 55 wt.-%, or 50 wt.-%.

In other embodiments, the adhesive comprises at least one tackifier. The tackifier can have any suitable softening temperature or softening point. The softening temperature is often less than 200° C., less than 180° C., less than 160° C., less than 150° C., less than 125° C., or less than 120° C. In applications that tend to generate heat, however, the tackifier is often selected to have a softening point of at least 75° C. Such a softening point helps minimize separation of the tackifier from the rest of the adhesive composition when the adhesive composition is subjected to heat such as from an electronic device or component. The softening temperature is often selected to be at least 80° C., at least 85° C., at least 90° C., or at least 95° C. In applications that do not generate heat, however, the tackifier can have a softening point less than 75° C.

Exemplary tackifiers include hydrocarbon resins and hydrogenated hydrocarbon resins, e.g., hydrogenated cycloaliphatic resins, hydrogenated aromatic resins, or combinations thereof. Suitable tackifiers are commercially available and include, e.g., those available under the trade designation ARKON (e.g., ARKON P or ARKON M) from Arakawa Chemical Industries Co., Ltd. (Osaka, Japan); those available under the trade designation ESCOREZ (e.g., ESCOREZ 1315, 1310LC, 1304, 5300, 5320, 5340, 5380, 5400, 5415, 5600, 5615, 5637, and 5690) from Exxon Mobil Corporation, Houston, Tex.; and those available under the trade designation REGALREZ (e.g., REGALREZ 1085, 1094, 1126, 1139, 3102, and 6108) from Eastman Chemical, Kingsport, Tenn.

The concentration of tackifier can vary depending on the intended adhesive composition. In some embodiments, the amount of tackifier is at least 5 wt.-%, 10 wt.-% or 15 wt.-%. The maximum amount of tackifier is typically no greater than 45 wt.-%, or 40 wt.-%, or 35 wt.-%, or 30 wt.-%, or 25 wt.-%. tackifying resin. For removeable masking tapes, the tackifier concentration may be no greater than about 30 wt-%. However, for other uses, higher tackifier concentrations may be favored.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid poly(isobutylenes) such as Glissopal™, and the like, waxes, and mixtures of oils. A plasticizer may be present in the pressure sensitive adhesive of the present invention in an amount of 1, 2, 3, 4 or 5 wt.-%, and typically no greater than 30, or 25, or 20 or 15, or 10 wt.-% of the adhesive composition.

Those skilled in the art will also know that other additives such as fillers, antioxidants, stabilizers, and colorants may be blended with the adhesive for beneficial properties.

In favored embodiments, the (e.g. cured) adhesive is a pressure sensitive adhesive. According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests designed to measure tack, adhesion (peel strength), and cohesion (shear holding power). These measurements taken together constitute the balance of properties often used to characterize a PSA.

For example, if the glass transition temperature ($T_g$) or modulus of the elastomer is too high and above the Dahlquist criterion for tack (storage modulus of $3\times10^6$ dynes/cm$^2$ at room temperature and oscillation frequency of 1 Hz), the material will not be tacky and is not useful by itself as a PSA material. Often in this case, low molecular weight, high $T_g$ resin polymers (tackifiers) or low molecular weight, low $T_g$ polymers (plasticizers) are often used to modulate the $T_g$ and modulus into an optimal PSA range.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are olefin-based thermoplastics (polypropylene, polyethylene, high density polyethylene or HDPE, ethylene propylene diene monomer rubber (EPDM)), as well as polystyrene and poly(methyl methacrylate) (PMMA). Such material as commonly used in automotives, paints, appliances and electronics markets. Other substrates may also have properties of low surface energy due to a residue, such as an oil residue or a film such as paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics, glass and metals. The adhesive compositions described herein are also suitable for the medical adhesive field due to having low odor and being physiologically inert.

The pressure sensitive adhesive can exhibit various peel and shear properties, depending on the intended end use.

In some embodiments the 90 degree peel to glass, stainless steel, high density polyethylene (HDPE), polypropylene (PP), or EPDM thermoplastic elastomer is at least 5 oz/inch (5 N/dm) for a temporary removable or low temperature PSA. For masking tapes, the 90 degree peel to glass, stainless steel, HDPE, PP, or TPE is typically 15-20 oz/inch (16-22 N/dm). In some favored embodiments, the adhesive exhibits good adhesion to both high and low surface energy substrates. In some embodiments the 90 degree peel to glass, stainless steel, or HDPE is independently at least 10, 15, 25, 30, 35, 40, 45, or 50 oz/inch. In some embodiments the 90 degree peel to PP or EPDM thermoplastic elastomer is independently at least 30, 40, 50, 60, 70, 80, or 100 oz/inch. In some favored embodiment, the shear at room temperature (23° C.) or 70° C. is at least 2,000 minutes; 4,000 minutes; 8,000 minutes; or 10,000 minutes.

The substrate (to which the PSA is bonded) is selected depending on the particular application in which it is to be used. For example, the adhesive can be applied to sheeting products, (e.g., decorative graphics and reflective products), label stock, and tape backings Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single-coated or double-coated tape in which the adhesive is disposed on a permanent backing Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

The following, non-limiting, examples further describe exemplary adhesives and adhesive articles of the present disclosure, as well as exemplary methods for making such adhesives and adhesive articles.

EXAMPLES

As used herein, all parts and percentages are by weight unless otherwise specified.

Test Methods:

90° Angle Peel Adhesion Strength Test A

Peel adhesion strength was measured at a 90° angle using an IMASS SP-200 slip/peel tester (available from IMASS, Inc., Accord Mass.) at a peel rate of 305 mm/minute (12 inches/minute). Test panels were prepared by wiping the panels with a tissue wetted with the corresponding solvents shown in Table 1 using heavy hand pressure to wipe the panel 8-10 times. This procedure was repeated two more times with clean tissues wetted with solvent. The cleaned panels were allowed to dry. An adhesive coated film was cut into tapes measuring 1.27 cm×20 cm (½ in.×8 in.) and the tapes were rolled down onto the cleaned panel with a 2.0 kg (4.5 lb.) rubber roller using 2 passes. The prepared tape samples were stored at 23° C./50% RH for 24 hours before testing. Two samples were tested for each example and averaged values were expressed in N/dm. Failure mode was noted and recorded as COH—cohesive, i.e., the adhesive split leaving residue on both the tape and test surface, ADH—adhesive, i.e., the adhesive peeled cleanly from the test surface, and MIX—the adhesive peeled cleanly from some areas and adhered to the surface in other areas within the test area.

TABLE 1

Peel Adhesion Test Panel Materials

| Material | Solvent |
| --- | --- |
| HDPE—High density polyethylene | Isopropyl alcohol |
| PP—Polypropylene | Isopropyl alcohol |
| EPDM—Ethylene propylene diene monomer rubber | Isopropyl alcohol |
| TPE—Thermoplastic Elastomer (Santoprene) based on EPDM and PP | Isopropyl alcohol |
| SS—Stainless Steel | Heptane |
| Glass—Soda-lime glass | Heptane |

90° Angle Peel Adhesion Strength Test B

Peel Adhesion Strength Test B was conducted similarly to Test A. Peel adhesion was measured on a Zwick tensile tester at a peel rate of 300 mm/min. Stainless steel test panels (SS) were first cleaned by with methyl ethyl ketone and wiping with a tissue, then with a 50/50 mixture of distilled water and isopropyl alcohol and wiping. Polypropylene (PP) films and polyethylene (PE) films were used as received without cleaning. PP and PE test substrates were prepared by taping 50 by 100 mm strips of PP or PE onto aluminum panels using 3M SE100 Transfer Adhesive (3M Company; St. Paul, Minn.).

Test samples were prepared by cutting the adhesive coated film or foam into 12.7 by 100 mm tapes. The release liner on the polyisobutylene adhesive surface removed and the adhesive surface was affixed to the test surface the panel.

The release liner was removed from the other side of the foam tape and a 15 by 150 mm aluminum strip was rolled onto the tape test sample with two passes of a 6.8 kg steel roller. The test samples were then conditioned for 24 hours at 23° C. and 50% relative humidity before testing. The peel adhesion force was measured in N/12.7 mm and converted to N/cm. Data is the average of 2 measurements.

Static Shear Strength Test A

The static shear strength was evaluated generally as described in the ASTM International standard, D3654, Procedure A at 23° C./50% RH (relative humidity) using a 1000 g load at room temperature and/or 70° C. Tapes measuring 1.27 cm×15.24 cm (½ in.×6 in.) were adhered to 1.5 inch by 2 inch stainless steel (SS) panels using the method to clean the panel and adhere the tape to it as described in the peel adhesion test. The tape overlapped the panel by 1.27 cm×2.5 cm. and the strip was folded over itself on the adhesive side, and then folded again. A hook was hung in the second fold and secured by stapling the tape above the hook. The weight was attached to the hook and the panels were hung in a 23° C./50% RH room or a 70° C. oven until the weight pulled away from the test panel. The time to failure, when the weight pulled away, was recorded in minutes. If no failure was observed after 10,000 minutes, the test was stopped and a value of 10,000 minutes was recorded. The mode of failure described in the peel adhesion test was also noted.

Static Shear Strength Test B

Static Shear Strength Test B was conducted similarly to Test A. Stainless steel panels were cleaned as described for Peel Adhesion Test B. A test sample was prepared by adhering a 12.7 by 25.4 mm tape to the SS panel with the polyisobutylene adhesive on the SS panel. The other liner was removed from the tape and covered with an aluminum plate. A 6.8 kg steel roller was rolled over the test sample 2 times and the sample was conditioned for 24 hours at 24 hours at 23° C. and 50% relative humidity. A 500 g weight was hung on the aluminum plate until the weight pulled away from the panel. Failure time, when the weight pulled away, was recorded in minutes. The data is an average of 2 measurements Materials used in examples
  Brominated polyisobutylene copolymers from Lanxess Corp.; Fairlawn, Ohio BPIB—Lanxess Bromobutyl 2030, Mooney viscosity @125° C. of 34 MU BBX2—Lanxess Bromobutyl X2, Mooney viscosity @125° C. of 46 MU.

BIMS—Brominated poly(isoprene-co-methylstyrene) from Exxonmobile (Baytown, Tex.) Exxpro 3745 (bromine content: 1.2 mol %)

TACK1—cycloaliphatic hydrocarbon based tackifier (ESCOREZ 5340 tackifier, ExxonMobil Corporation; Baytown, Tex.)

TACK2—aliphatic hydrocarbon resin (Piccotac™ 1094E Hydrocarbon Resin), Eastman

TACK3—liquid aliphatic hydrocarbon resin (Piccotac™1020E Hydrocarbon Resin), Eastman MWPIB—unfunctionalized, medium molecular weight (80K g/mol) polyisobutylene (OPPANOL B15 polymer, BASF; Florham Park, N.J.)

PET backing—Hostaphan® 3SAB—primed polyester film (Mitsubishi, Greer, S.C.)

Solvents—isopropyl alcohol, heptane, acetone, toluene (EMD; Gibbstown, N.J.)

Cyclic diamine crosslinkers
  DABCO—1,4-Diazabicyclo[2.2.2]octane (Alfa Aesar, Ward Hill, Mass.),
  Piperazine, anhydrous (Alfa Aesar, Ward Hill, Mass.)

HMDA—hexamethylenediamine (Aldrich; Seelze Germany)

MgO—magnesium oxide (Solvay; Angera, Italy)

Examples 1-3 and Reference Example R1

An adhesive composition for Example 1 was prepared by mixing 1 parts of DABCO (1,4-Diazabicyclo[2.2.2]octane) with 100 parts of BPIB (Lanxess 2030) in 400 parts of toluene in a 100 mL jar. The jar was capped and mixed on a roller mill at room temperature overnight. Examples 2-3 were prepared in the same manner except with 2 and 5 parts of DABCO, respectively, per 100 parts of BPIB. Example R1 was prepared with only 100 parts of BPIB and no DABCO.

Each of the compositions were then knife-coated onto the primed surface of a 6 inch by 25 inch strip of PET backing (Hostaphan® 3SAB) to a thickness of about 15 mils wet. The coated film was dried in an oven set at 70° C. for 20 minutes to provide a tape having an adhesive coating thickness of about 2 mils. The coated films were conditioned, prepared into tape samples and tested for peel adhesive and shear strength according to the 90° Peel Adhesion Test A and the Static Shear Strength Test A. Results are shown in Table 2.

TABLE 2

| | Adhesive Properties | | | | | | | | | |
|---|---|---|---|---|---|---|---|---|---|---|
| | 90° Peel Adhesion [oz/inch, (N/dm)] | | | | | | Failure | Shear Strength | | Failure |
| Ex | HDPE | PP | EPDM | TPE | SS | Glass | Mode* | RT | 70° C. | Mode* |
| 1 | 7(8) | 56(61) | 66(72) | 49(54) | 30(33) | 14(14) | ADH | 10,000 | 10,000 | None |
| 2 | 15(16) | 55(60) | 82(90) | 88(96) | 23(25) | 14(15) | ADH | 10,000 | 10,000 | None |
| 3 | 10(11) | 43(47) | 76(83) | 54(59) | 23(25) | 12(13) | ADH | 10,000 | 10,000 | None |
| R1 | 16(18) | 69(76) | 84(92) | 141(154) | 22(24) | 15(16) | MIX | 1,036 | 150 | COH |

*Same were failure modes observed on all of the substrates tested.

Example 4-6

An adhesive composition for Example 4 was prepared according to the procedure for Example 1 except using 1 part piperazine in place of the DABCO. Examples 5-6 were prepared in the same manner except 2 and 5 parts of piperazine, respectively, were added per 100 parts of BPIB. Tape samples were prepared and tested according to the procedure in Example 1 and results are shown in Table 3.

TABLE 3

Adhesive Properties

| | 90° Peel Adhesion [oz/inch, (N/dm)] | | | | | | | Shear Strength | | |
|---|---|---|---|---|---|---|---|---|---|---|
| Ex | HDPE | PP | EPDM | TPE | SS | Glass | Failure* | RT | 70° C. | Failure* |
| 4 | 6(7) | 37(40) | 17(19) | 14(15) | 21(23) | 10(11) | ADH | 10,000 | 10,000 | None |
| 5 | 10(11) | 43(47) | 13(14) | 9(10) | 27(30) | 13(14) | ADH | 10,000 | 10,000 | None |
| 6 | 4(4) | 8(9) | 8(9) | 2(2) | 15(2) | 12(16) | ADH | 10,000 | 10,000 | None |

*Same were failure modes observed on all of the substrates tested.

Examples 7-10

DABCO Crosslinked PIB PSAs with TACK1 or Unfunctionalized PIB

Adhesive compositions were prepared by mixing PIB, MWPIB (Oppanol B15), DABCO, and optional TACK1 (Escorez 5340) in the amounts shown in Table 4 to 400 parts of toluene in 100 mL glass jars. The total amount of polyisobutylene, i.e., the amount of BPIB and MWPIB together, was maintained at 100 parts. The jars were capped and mixed on a roller mill overnight. Tape samples were prepared from the compositions and tested according to the procedures of Example 1. Test results are shown in Table 5.

TABLE 4

Adhesive Compositions

| Ex | BPIB (parts) | MWPIB (parts) | TACK1 (parts) | DABCO (parts) |
|---|---|---|---|---|
| 7 | 80 | 20 | | 1.6 |
| 8 | 60 | 40 | | 1.2 |
| 9 | 80 | 20 | 20 | 1.6 |
| 10 | 60 | 40 | 20 | 1.2 |

TABLE 5

Tape Adhesive Properties

| | 90° Peel Adhesion [oz/inch, (N/dm)] | | | | | | | Shear Strength | |
|---|---|---|---|---|---|---|---|---|---|
| Ex | HDPE | PP | EPDM | TPE | SS | Glass | Failure* | RT | Failure* |
| 7 | 9(10) | 41(45) | 48(53) | 76(83) | 25(27) | 15(16) | ADH | 10,000 | None |
| 8 | 13(14) | 47(51) | 58(63) | 86(94) | 28(31) | 24(26) | ADH | 10,000 | None |
| 9 | 23(25) | 52(57) | 46(50) | 80(88) | 45(49) | 27(30) | ADH | 10,000 | None |
| 10 | 29(32) | 64(70) | 54(59) | 92(101) | 41(45) | 33(36) | ADH | 5200 | COH |

*Same were failure modes observed on all of the substrates tested.

Example 11 and Reference Example R2

An adhesive composition was prepared by weighing 60 parts BBX2, 25 parts of TACK2 (P1094E), and 15 parts of TACK3 (P1020E) into a 200 mL jar, and adding 400 parts of toluene. The jar was capped and mixed on a roller mill for 3 days to dissolve the components. Then 1.8 parts of MgO and 0.4 part HMDA were added to the adhesive composition and mixed with a high speed mixer for 2 minutes at 2000 revolutions/minute to disperse the MgO.

The resulting pressure sensitive adhesive solution was then knife coated onto a silicone release liner with a gap of 300 micrometers. The coated adhesive film was allowed to dry at room temperature for about 20 minutes, and then heated in an oven set at 150° C. for 5 minutes.

A primer was prepared by knife coating 3M™ Scotch™ Mount 4297 Primer (3M Company; St. Paul, Minn.) onto a silicone release liner with a gap of 100 micrometers. The coating was dried at room temperature for about 30 minutes and then laminated to a 1.2 mm thick acrylic foam tape (GT6012 Acrylic Foam Tape, 3M Company; St. Paul, Minn.). An adhesive coated tape was prepared by laminating the coated adhesive film onto the primer at 100° C.

An adhesive composition and tape were prepared in the same manner for Reference Example R2 except that the MgO and HMDA were omitted.

Tapes were prepared and tested according to the 90° Peel Adhesion Test B and the Static Shear Strength Test B. Test results are shown in Table 6.

TABLE 6

Tape Adhesive Properties

| | 90° Peel Adhesion (N/cm) | | | | Shear Strength | |
|---|---|---|---|---|---|---|
| Ex | PE | PP | SS | Failure | RT | Failure |
| 11 | 24.9 ± 4.4 | 29.3 ± 3.0 | 26.0 ± 4.0 | ADH | 10,000 | None |
| R2 | 33.0 ± 0.7 | 24.6 ± 2.5 | 26.2 ± 1.9 | ADH | 883 | COH |

Example 12 and Reference Example R3

The adhesive composition for Example 12 was prepared by mixing 1 parts of DABCO (1,4-Diazabicyclo[2.2.2]octane) with 100 parts of BIMS (Exxpro3745) in 400 parts of toluene in a 100 mL jar. The jar was capped and mixed with a touch mixer (Fisher Scientific, Pittsburgh, Pa. Model 232) at room temperature for 2-3 min. Example R3 was prepared in the same manner with only 100 parts of BIMS and no DABCO.

Each of the compositions were then knife-coated onto the primed surface of a 6 inch by 25 inch strip of PET backing (Hostaphan® 3SAB) to a thickness of about 15 mils wet. The coated film was dried in an oven set at 70° C. for 20 minutes to provide a tape having an adhesive coating thickness of about 2 mils. The coated films were conditioned, prepared into tape samples and tested for peel adhesive and shear strength according to the 90° Peel Adhesion Test A and the Static Shear Strength Test A. Results are shown in Table 7.

TABLE 7

| | | 90° Peel Adhesion [oz/inch, (N/dm)] | | | | | Failure | Shear Strength | | Failure |
|---|---|---|---|---|---|---|---|---|---|---|
| Ex | HDPE | PP | EPDM | TPE | SS | Glass | Mode* | RT | 70° C. | Mode* |
| 12 | 1(1) | 6(6) | 5(6) | 1(1) | 2(3) | 2(2) | ADH | 10,000 | 10,000 | None |
| R3 | 4(5) | 21(23) | 12(13) | 19(20) | 3(3) | 2(3) | MIX | 10,000 | 2020 | COH |

*Same were failure modes observed on all of the substrates tested.

As is evident from Table 7, inclusion of the DABCO crosslinker increased the shear strength at 70° C. The Peel Adhesion of Example 12 may be increased by inclusion of a tackifier optionally in combination with a plasticizer. The Peel Adhesion of Example 12 may alternatively be increased by utilizing a blend of the BIMS with either BBIM or BBX2.

What is claimed is:

1. An adhesive composition comprising the reaction product of at least one halogenated
    copolymer of isobutylene wherein halogen atoms of the copolymer are replaced by a cyclic aliphatic polyamine having a melting point greater than 25° C., thereby crosslinking the copolymer; wherein the cyclic aliphatic polyamine is of the general formula $R_5$—$(NR_1R_2)x$ wherein $R_1$ and $R_2$ are independently H or alkyl, $R_5$ is a polyvalent alkylene, x is at least two, and $R_1$ and $R_2$ taken together form a cyclic amine.

2. The adhesive composition of claim 1 wherein the polyamine crosslinker has a melting point of at least 100° C.

3. The adhesive composition of claim 1 comprising greater than 0% by weight but less than 10% by weight of isobutylene copolymer units bonded to each other.

4. The adhesive composition of claim 1 wherein the isobutylene copolymer comprises halogenated repeat units derived from isoprene, butadiene, para-alkyl styrene, or a combination thereof.

5. The adhesive composition of claim 1 wherein the halogenated copolymer comprises repeat units of the formula:

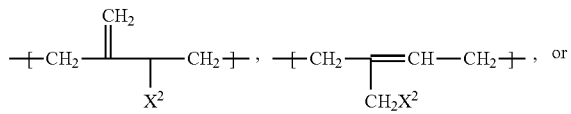

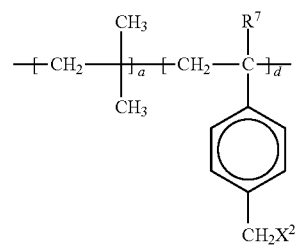

wherein $X^2$ is bromine.

6. The adhesive composition of claim 1 wherein the halogenated copolymer is of the formula

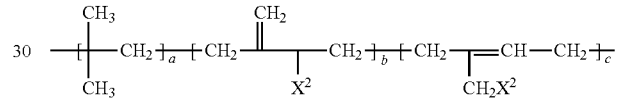

wherein a is at least 20, the sum of b, and c is at least one, and $X^2$ is bromine;
or wherein a is at least 20, d is at least one, and $X^2$ is bromine;
or

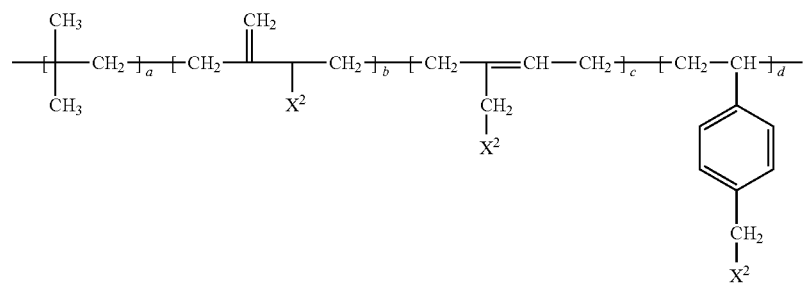

wherein a is at least 20, the sum of b, c, and d is at least one, and $X^2$ is bromine.

7. The adhesive composition of claim 1 wherein the halogenated copolymer has a molecular weight (Mw) of 50,000 to 5,000,000.

8. The adhesive composition of claim 7 wherein the halogenated copolymer has a molecular weight no greater than 1,000,000 g/mole or 500,000 g/mole.

9. The adhesive composition of claim 1 further comprising 5 to 50 wt.-% of tackifier.

10. The adhesive composition of claim 1 further comprising 10 to 60 wt.-% of the unfunctionalized polyisobutylene polymer.

11. The adhesive composition of claim 10 wherein the unfunctionalized polyisobutylene polymer has a molecular weight no greater than 100,000 g/mole.

12. An adhesive article comprising the adhesives of claim 1 on a backing.

13. An adhesive composition comprising a copolymer of isobutylene repeat units and second repeat units selected from alkene repeat units, para-methyl styrene repeat units, or a combination thereof wherein at least a portion of the second repeat units are directly bonded to one another with a cyclic aliphatic polyamine crosslinker having a melting point greater than 25° C.; wherein the cyclic aliphatic polyamine is of the general formula $R_5$—$(NR_1R_2)x$ wherein $R_1$ and $R_2$ are independently H or alkyl, $R_5$ is a polyvalent alkylene, x is at least two, and $R_1$ and $R_2$ taken together form a cyclic amine.

14. The adhesive composition of claim 13 comprising greater than 0% by weight but less than 10% by weight of isobutylene copolymer units bonded to each other.

15. The adhesive composition of claim 13 wherein the second repeat units are selected from alkene repeat units.

16. The adhesive composition of claim 13 wherein the halogenated copolymer has a molecular weight (Mw) of 50,000 to 5,000,000.

17. The adhesive composition of claim 13 further comprising tackifier, unfunctionalized polyisobutylene polymer, and mixtures thereof.

18. An adhesive composition comprising the reaction product of at least one halogenated copolymer of isobutylene wherein halogen atoms of the copolymer are replaced by a polyamine having a melting point greater than 25° C., thereby crosslinking the copolymer, wherein the halogenated copolymer is of the formula

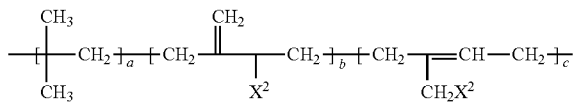

wherein a is at least 20, the sum of b, and c is at least one, and $X^2$ is bromine and the polyamine is an aliphatic straight-chain or branched polyamine comprising an alkylene group having at least 6 carbon atoms.

19. The adhesive composition of claim 18 comprising greater than 0% by weight but less than 10% by weight of isobutylene copolymer units bonded to each other.

20. The adhesive composition of claim 18 further comprising tackifier, unfunctionalized polyisobutylene polymer, and mixtures thereof.

* * * * *